United States Patent [19]

Paton et al.

[11] Patent Number: 4,940,996

[45] Date of Patent: Jul. 10, 1990

[54] DROP-ON-DEMAND PRINTHEAD

[76] Inventors: Anthony D. Paton, The Thatched Cottage, 51 Mills Lane, Longstanton St. Michael, Cambridge; Stephen Temple, 66 Girton Road, Cambridge, CB3 OIN; Mark R. Shepherd, 116 King James Way, Royston, Hertfordshire, SG8 7EF, all of England

[21] Appl. No.: 345,600

[22] Filed: Apr. 28, 1989

[30] Foreign Application Priority Data

Apr. 29, 1988 [GB] United Kingdom ................. 8810241

[51] Int. Cl.[5] .......................... G01D 15/18; B41J 2/04; B41J 2/145

[52] U.S. Cl. .................................. 346/140 R; 346/75; 400/126

[58] Field of Search ................ 346/140 R, 76 PH, 75; 400/126

[56] References Cited

U.S. PATENT DOCUMENTS

| | | | |
|---|---|---|---|
| 3,560,641 | 2/1971 | Taylor | 346/75 |
| 3,946,398 | 3/1976 | Kyser | 346/140 PD |
| 4,063,254 | 12/1977 | Fox | 346/75 |
| 4,194,210 | 3/1980 | Krause | 346/75 |
| 4,232,324 | 11/1980 | Tsao | 346/75 |
| 4,357,614 | 11/1982 | Tamai | 346/75 |
| 4,510,509 | 4/1985 | Horike et al. | 346/140 R |
| 4,528,575 | 7/1985 | Matsuda et al. | 346/140 R |

OTHER PUBLICATIONS

IBM Technical Disclosure Bulletin (vol. 23, No. 7A), Dec. 1980, "Dual Resolution Ink Jet Drum Printer", W. E. Althauser, S. J. Fox, Rt. Ritchie, pp. 2700–2702.

*Primary Examiner*—George H. Miller, Jr.
*Assistant Examiner*—Scott A. Rogers
*Attorney, Agent, or Firm*—Nicholas A. Camasto; Jack Kail

[57] ABSTRACT

A drop-on-demand ink drop printhead is mounted fixed in a printer for selectively printing drops of ink in a print line. The printhead comprises a plurality of stacks of like print modules arranged in side-by-side relationship to form a number of laterally offset module layers. Each of the modules includes at least one group of uniformly laterally spaced ink ejectors, the groups in each layer being laterally spaced by the same amount such that drops from overlapping portions of two or more of the groups interleave to form a segment of the print line. Make-up ink and air supply ducting arrangements are provided for the modules in each stack.

23 Claims, 8 Drawing Sheets

DROP-ON-DEMAND PRINTHEAD

CROSS-REFERENCE TO RELATED APPLICATION

This application is related to application Ser. No. 140,617, filed Jan. 4, 1988, in the names of A. J. Michaelis, A. D. Paton, S. Temple and W. S. Bartky, entitled "Droplet Deposition Apparatus" and application Ser. No. 140,764, filed Jan. 4, 1988, in the names of W. S. Bartky, A. D. Paton, S. Temple and A. J. Michaelis, entitled "Droplet Deposition Apparatus," both of which applications are incorporated herein by reference and are assigned to the assignee of the present application.

BACKGROUND OF THE INVENTION

The present invention relates to drop-on-demand printheads of the type which selectively print drops of ink in a print line on a web or sheet which moves relatively to the printhead.

Drop-on-demand printheads have been used to form travelling printheads for printing the height of one or a few print lines at a time. Certain developments in drop-on-demand printhead design give the prospect of low cost nozzle module assemblies which can be mounted fixed in the printer to form a wide printbar substantially spanning the width of the paper. Recent advances in printhead reliability make this prospect practical as well as economical. Specifically, the above noted related applications describe such drop-on-demand printhead design developments.

OBJECTS OF THE INVENTION

It is a basic object of the present invention to provide an improved drop-on-demand printhead for selectively printing drops of ink in a print line on a web or sheet which is movable in relation to the printhead.

It is a further object of the invention to provide a drop-on-demand printhead which is mounted fixed in a printer to form a wide printbar substantially spanning the width of the print surface.

It is another object of the invention to provide a drop-on-demand printhead of the foregoing type which is both economical to manufacture and reliable in operation.

In accordance with these and other objects, a drop-on-demand printhead constructed according to the invention comprises a plurality of vertically oriented stacks of print modules arranged in abutting relation to form a plurality of laterally offset layers of print modules. Each module in each of the layers provides at least one group of lateral uniformly spaced ink ejectors. Successive groups of ejectors in each layer are laterally spaced by the same amount such that drops from vertically overlapping portions of ejector groups from different module layers interleave to form a segment of a print line. The density of the segment is equal to the product of the drop deposition density of each group and the number of groups contributing to form the segment. Preferably, the number of ejector groups combining to form the print line segment is one less than the number of layers. Ink supplies and housekeeping fluids are preferably distributed through each stack individually. Make-up ink supplies are coupled to the modules through a riser extending through each respective stack. Each stack also includes an air duct arrangement forming a continuous air supply passage through the module layers.

According to a further aspect of the invention, a housekeeping manifold is provided for each module which communicates with the air duct arrangement to supply environment fluids to or exhaust such fluids from the vicinity of the ink ejecting apertures of each module.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
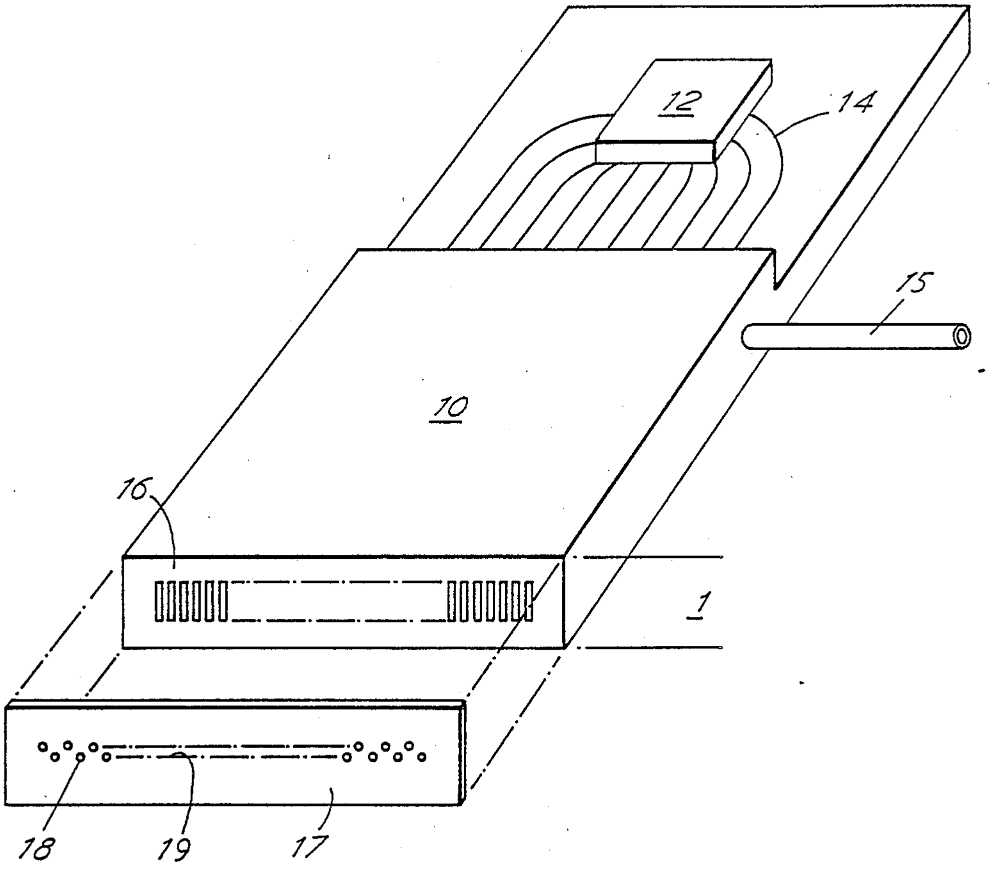
FIG. 1 is a partially broken perspective view of a drop-on-demand printhead module of the type disclosed in copending U.S. application Ser. No. 140,617.

FIG. 1 shows a module 10 of a piezo-electric shear mode actuated drop-on-demand printhead of the type illustrated in co-pending U.S. application Ser. No. 140,617. While the invention will be described in relation to printhead modules of this type of construction, printhead modules of other forms may also be used, the invention therefore not being limited by the particular module construction employed. However, piezo-electrically driven ink drop ejectors prior to that disclosed in the above co-pending application were limited to a channel spacing of 1 to 2 channels per mm. The modules illustrated in FIG. 1, on the other hand, are able to be produced at much higher densities, for example, 4, 16/3, and 8 channels per mm. As described in further detail hereinafter, such modules can be conveniently assembled into a wide printbar having, for example, 16 ink channels and printing 16 independently deposited drops per mm into a print line by stacking 5, 4 or 3 layers of laterally overlapping modules which combine 4, 3 or 2 rows of nozzles, respectively, to generate interleaved segments of the print line at the full design density.

The invention can be readily adapted to form a variety of print line densities both above and below 16 drops per mm, and is best suited to combining small numbers of modules (3–6) into stacks and to grouping multiple lines of stacks to form multi-color printbars. The invention is also readily adapted to printheads other than those which are piezo-electrically actuated, including thermal and air assisted types.

Returning to FIG. 1, module 10, which forms part of a printhead 1, is energized via a drive chip 12 and drive tracks 14. Each drive track 14 is connected to a corresponding ink channel 16 supplied via a manifold (not shown) with make-up ink from a supply 15. The ink channels 16 are terminated with corresponding nozzles 18 formed in a nozzle plate 17. The ink channels 16 and the corresponding nozzles 18 form a continuous row 19 of independently actuable ink drop ejectors occupying a substantial part of the width of the module 10 at a linear density of N drops per unit length.

Figure 2A:
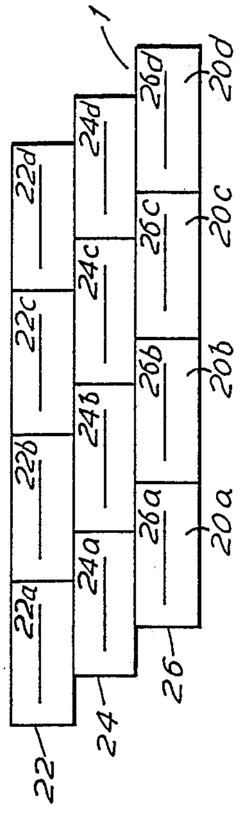
FIGS. 2(*a*), 2(*b*) and 2(*c*) are diagrammatic sectional views, each showing a printbar assembly in which a plurality of modules are grouped in stacks having, respectively, three, four or five layers of modules.
Figure 2B:
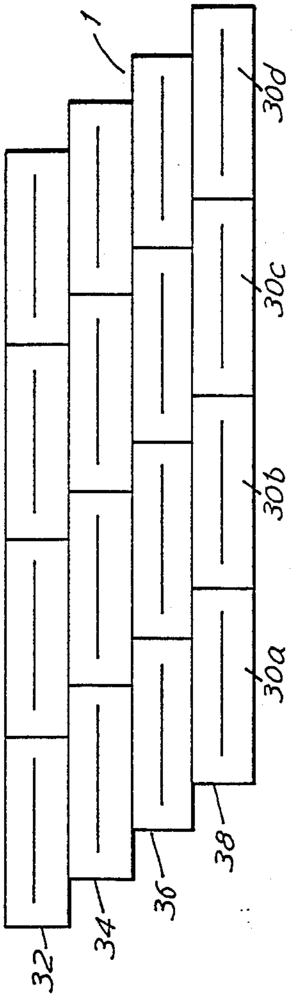
Figure 2C:
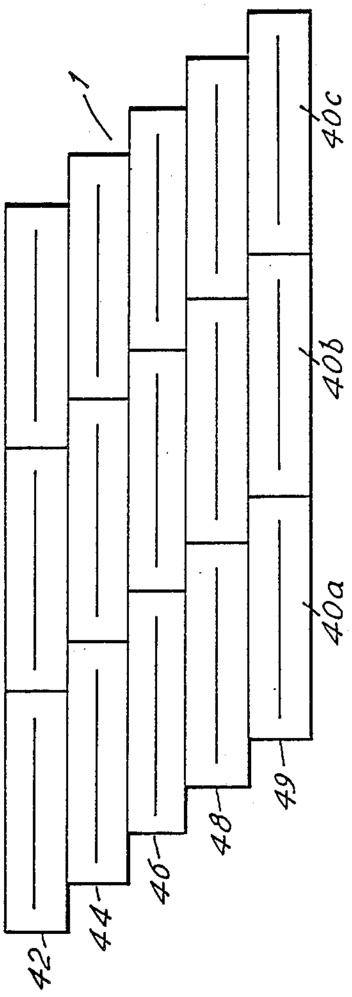

As illustrated in FIG. 2, modules 10 are conveniently incorporated into a printbar having drop densities of 2N, 3N or 4N (rN) etc. drops per unit length by combining the modules in separate stacks having 3, 4 or 5, (r+1) etc. layers, respectively, of overlapping modules. For example, FIG. 2(*a*) illustrates a printhead 1 made up of separable stacks 20*a*, 20*b*, 20*c* and 20*d* of laterally overlapping like modules. When combined as shown, the stacks form three laterally offset layers 22, 24, 26 which provide a print density of 2N drops per unit length, where N is the density of ink channels in one of the modules. The horizontal line drawn in each module represents a line of nozzles located so that two lines of nozzles from different layers interleave one another when projected onto the print line. In particular, one segment of the print line is made up by interleaving drops from the right hand side of each top layer module 22*a–d* and the left hand side of the middle layer module 24*a–d* of the corresponding stack. A second segment is made up by interleaving drops from the right hand side of each middle layer module 24*a–d* and the left hand side of the bottom layer module 26*a–d* of the corresponding stack. The third segment is made up by interleaving drops from the right hand side of the bottom layer module 26*a–d* of one stack and the left hand side of the top layer module of the adjacent stack 20*b–e*. The necessary print delay associated with operation of the modules in each layer needed to effect collinear deposition of the drops from the different layers of modules is readily accomplished by data storage in chip 12.

FIG. 2(*b*) shows a corresponding arrangement of stacks 30*a–d* forming four layers 32, 34, 36 and 38 of laterally overlapping like modules. This arrangement provides a print density of 3N. In this case, each segment of the print line is formed by interleaving drops from three modules. Similarly, FIG. 2(*c*) shows corresponding stacks 40*a–c* arranged in five layers of like modules per stack and achieving a print density of 4N. Drops from four modules are interleaved to form each segment of the print line in this arrangement. In each case the extra layer provides an interval between the overlapping modules to butt the adjacent modules while at the same time providing for the supply of ink to the ink channels and air or solvent flow to the housekeeping manifolds as hereinafter described.

Replaceable stacks of like laterally offset modules combined to form layers of laterally overlapping modules as shown in FIG. 2 provide a number of advantages. One advantage of overlapping modules is that the ink modules can be conveniently butted in each layer leaving a region between the ink channels of adjoining modules containing no ink channels. These intervals can be conveniently used for connecting to the necessary housekeeping manifolds. Also, since the outermost channels in each module are located inwardly from the sides of the module, the modules have a robust construction. Another benefit is that by forming a printbar out of a number of replaceable stacks, field servicing of a wide printbar is more readily accomplished than by replacing the entire printbar. Modules in each stack may also optionally be replaced.

A further benefit is that a simple alignment procedure can be used for assembling the modules together into stacks using physical guides (such as dowels or pre-cut grooves and location bars) or optical means (using a vernier system of readily observed optical fringes). The same alignment procedure can be used progressively to locate nozzles relative to the modules during nozzle manufacture, to assemble modules into a stack and to assemble the stacks into the printbar so that the nozzles and nozzle plates are automatically aligned by appropriately designed jigging in manufacture relative to a fixed datum in the printbar. In this way all the nozzles in the stack are correctly interleaved in alignment with the printbar.

A particular advantage of having nozzles interleaved from different layers of the stack is that even if failure of a whole module occurs, the print line shows only a change in the print shade and the drawing or written page is substantially readable.

Another design advantage is that whereas modules and stacks are individually replaceable, housekeeping manifold supplies, electronic power and data are organized on a printbar basis.

A further advantage is that the same modules can be incorporated into printbars having a multiple density of 2N, 3N and 4N etc., providing for a range of print quality from the same modular parts.

Figure 3:
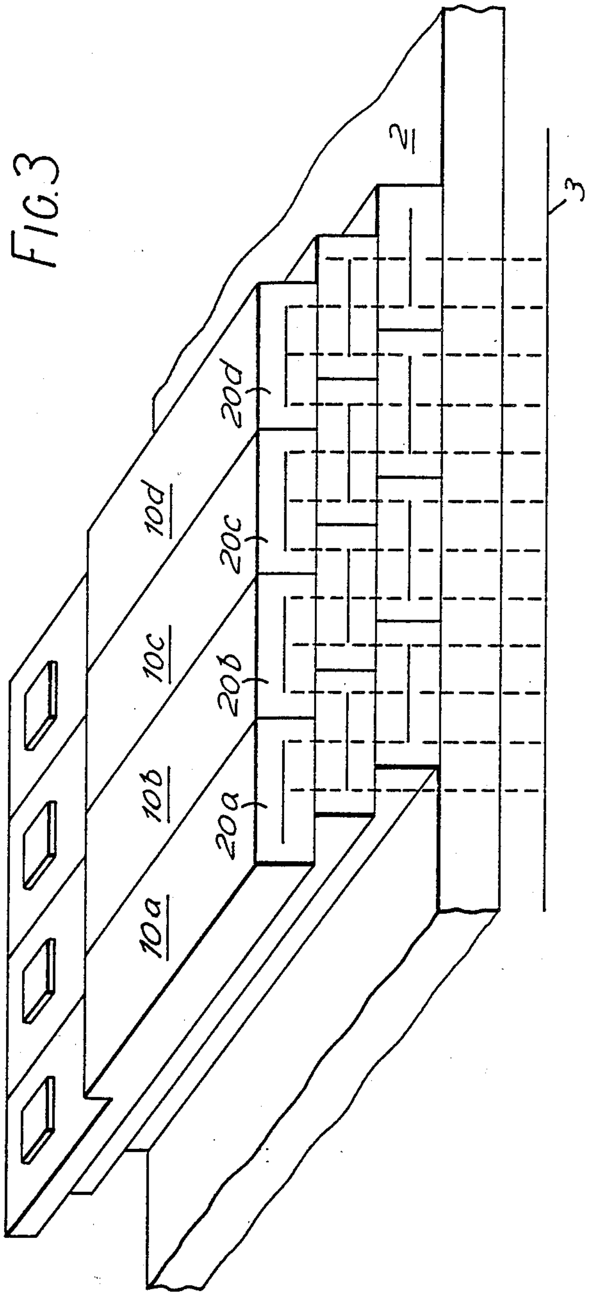
FIG. 3 is an isometric projection of a printbar assembly of the type in which stacks are grouped having three layers of modules.

FIG. 3 shows an isometric perspective view of a three layer stack, in which the relative locations of the overlapping modules 10, stacks 20 and printbar 2 can be visualized. Segments of the print line 3 are each made up of nozzles interleaved from two modules in any section. To better illustrate this the print line is shown below the module layers. It is, of course, in practice to be found on the web or sheet which moves across the face of the printhead.

The modules assembled in printbars in FIG. 2 at first appear to be unconstrained in the number of nozzles per module and hence module size. Obviously, once the resolution of the nozzles (N nozzles/mm) in each module and the number of rows r of nozzles which are interleaved to form any particular segment of the print line is decided, then if the number of layers of modules in a stack is (r + 1), the print line density is constrained to the integral multiple rN dots/mm.

In practice, however, the number of ink channels energized by one chip is usually a binary number, for example, 32 (5 bit), 64 (6 bit), or 128 (7 bit), etc. In addition, one module may carry more than one chip. Thus, the length L of the continuous row of nozzles in one module is limited to only certain values such as:

L=32/N mm; 64/N mm; 128/N mm; etc., where N is the nozzle resolution.

Also, since the stack pitch is L(r+1)/r, the pitch p of the stacks will also be limited to the values:

$$p = 32\left(\frac{r+1}{rN}\right)\text{mm};\ 64\left(\frac{r+1}{rN}\right)\text{mm};\ 96\left(\frac{r+1}{rN}\right)\text{mm; etc.}$$

Hence, there is a limited set of stack pitches for 16 dots/mm print density as given by the table 1 below.

TABLE 1

| Nozzle Resolution | | No. of output leads of the chip(s) 32 | 64 | 96 | 128 | 192 | 256 |
|---|---|---|---|---|---|---|---|
| 8 per mm | r = 2 | p = 6 | 12 | 18 | 24 | 36 | 48 |
| 16/3 per mm | 3 | 8 | 16 | 24 | 32 | 48 | 64 |
| 4 per mm | 4 | 10 | 20 | 30 | 40 | 60 | 80 |

(r + 1) layers: pitch of stack (mm).

It will be obvious that certain other cases can also be constructed. For example, the number of layers of modules in a stack can be trivially modified to have (r+2) or 2(r+1) layers. Alternatively, stacks can (as will later be illustrated) be doubled in width to incorporate two rows of nozzles in each laterally overlapping module part, with the advantage that feedthroughs can be delivered centrally rather than at the edge of the modules. These alternative cases do not alter the basic principles involved of combining laterally overlapping modules into the stacks.

Figure 4:
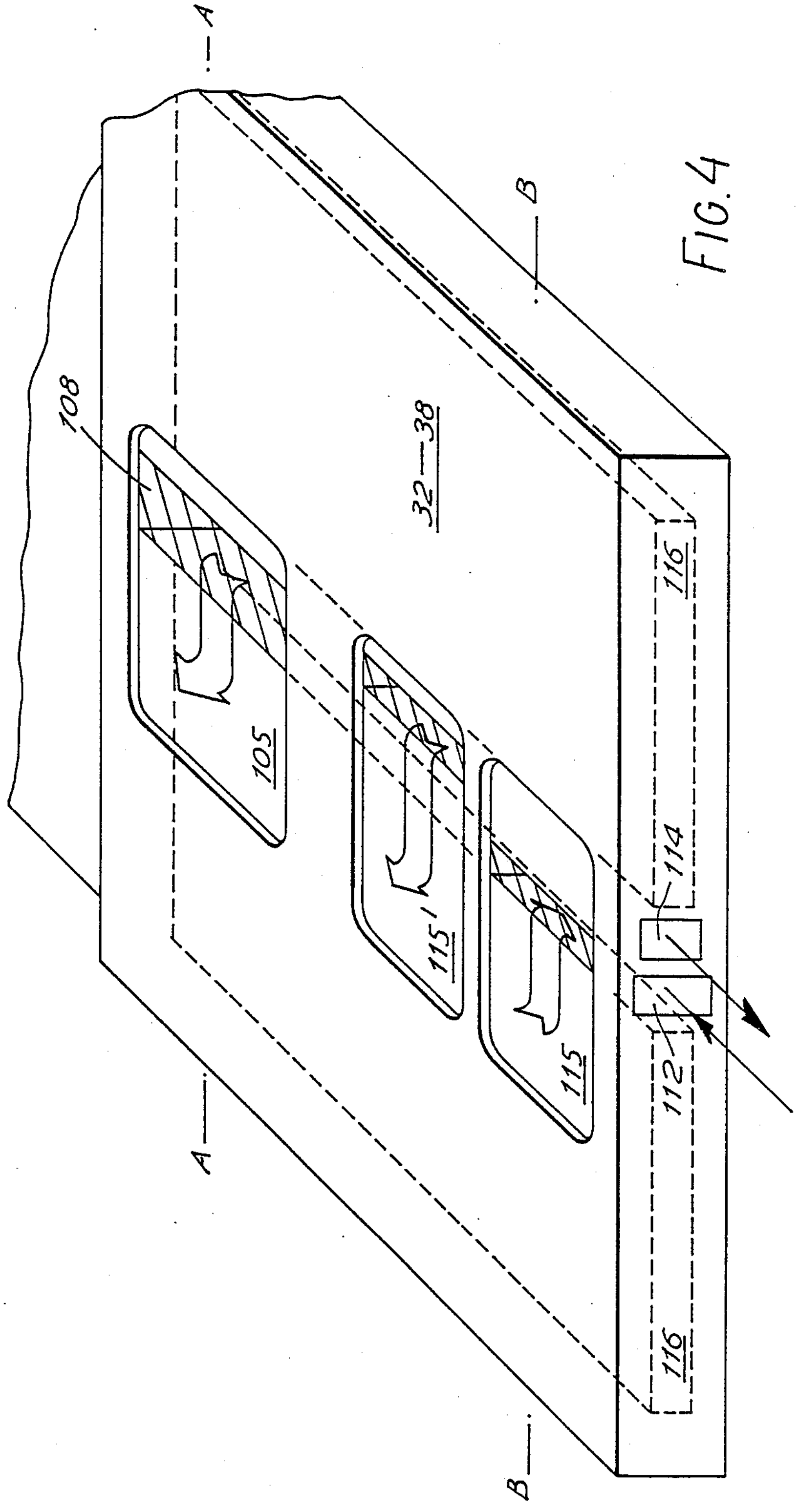
FIG. 4 is an isometric projection view of a single module particularly illustrating feed-through ducts for the supply of ink and air flow to and from housekeeping manifolds.

A particular advantage of the stack construction described above is that the supplies of ink, the housekeeping manifold fluids and electronic power and data may be organized on a printbar basis, but distributed through each stack individually. Accordingly, the modules in each stack are designed to feed the supplies from one module to another vertically through the stack. This is illustrated in FIGS. 4 and 5 wherein the modules of a stack are connected by a series of feed-throughs extending vertically through the stack.

Figure 5:
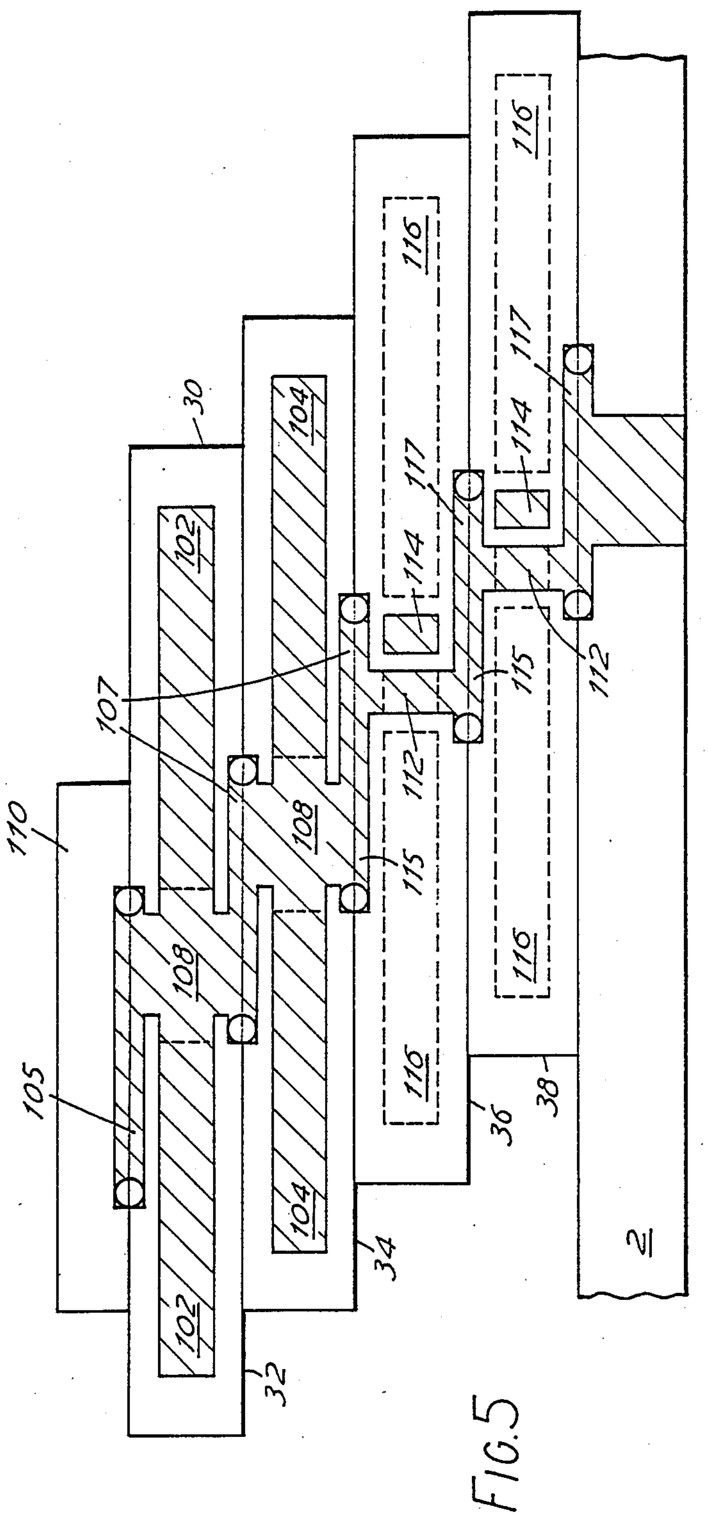
FIG. 5 is a section view of a stack comprising four layers of laterally overlapping modules of the type illustrated in FIG. 4.

In FIG. 5, a stack 30 mounted on printbar 2 comprises modules 32, 34, 36 and 38, each module having two rows of nozzles 19 which communicate with ejectors contained in the spaces 116. The modules are arranged in four overlapping layers as previously illustrated in FIG. 2(b). The ink supply system which feeds make-up ink vertically through the stack to replenish ink ejected from the print modules is shown in the upper two modules 32 and 34, which are sectioned on line AA in FIG. 4 in the rear of each module. Each module includes a pair of ink feed manifolds identical to manifolds 102 and 104 shown for modules 32 and 34, respectively. The manifolds are cut laterally across each module in opposite directions and are shown by the cross-hatching filled with ink. These manifolds connect with the ink channels 116 in FIG. 4 (16 in FIG. 1), so that suction is created in the manifolds when drops are ejected by actuation of the ink channels.

The modules are cut away to form apertures 105 and 107 on their upper and lower faces. The apertures are offset so that corresponding apertures are in alignment when the modules are assembled as an overlapping stack and are sealed by means of an O-ring 109 (or similar means) inserted round the periphery of the apertures. The apertures 105, 107 are also connected by a riser 108. A cover 110 is employed to seal the riser at the top of the stack. The feed-through vertically through the stack is thus formed by the apertures 105, 107, the risers 108 and the manifold branches 102, 104, etc. Preferably, the feed-through is made as large as practical to minimize the viscous resistance of the replenishment ink flow.

The air flows which are fed to and from the housekeeping manifold are ducted through feed-throughs in each stack as illustrated in FIG. 5 by the lower two modules 36 and 38. These modules are sectioned on line BB of FIG. 4 at the forward end of each module. The air flow supplied to or from one portion of the housekeeping manifold is delivered through a first bore 114 and the flow supplied to or from the other portion of the housekeeping manifold is delivered via a second bore 112. The bores 112 and 114 both exit the front face of the modules 32–38 and penetrate a substantial distance back through the modules between the space occupied by the ink channels 116. The bore 112 is connected to apertures 115 and 117 on the upper and lower faces, respectively, of each module, apertures 115 being seen in FIG. 4 and aperture 117 in FIG. 5. The apertures 115 and 117 are assembled in an overlapping stack and are sealed by means of O-rings. The bore 114 is similarly connected to apertures 115' on the upper faces of the modules immediately behind and separate from the former apertures 115. Apertures (not shown) offset with respect to apertures 115' are provided on the lower faces of the modules so that the modules can be similarly assembled and sealed. The stack assembly formed in this way enables a flow of ducted air to be delivered to or ducted from the modules in each stack by pressure and suction on the corresponding ducts in the printbar.

As described above, both ink and ducted air flows can be fed from the printbar to modules stacked in a laterally overlapping form of assembly for the continuous operation of the modules. If the modules provide a single group of ejectors rather than two groups, the ink supply duct would extend through the stacks rearwardly of the ink channel where it would be connected to those channels, for example, by way of a manifold.

Figure 6:
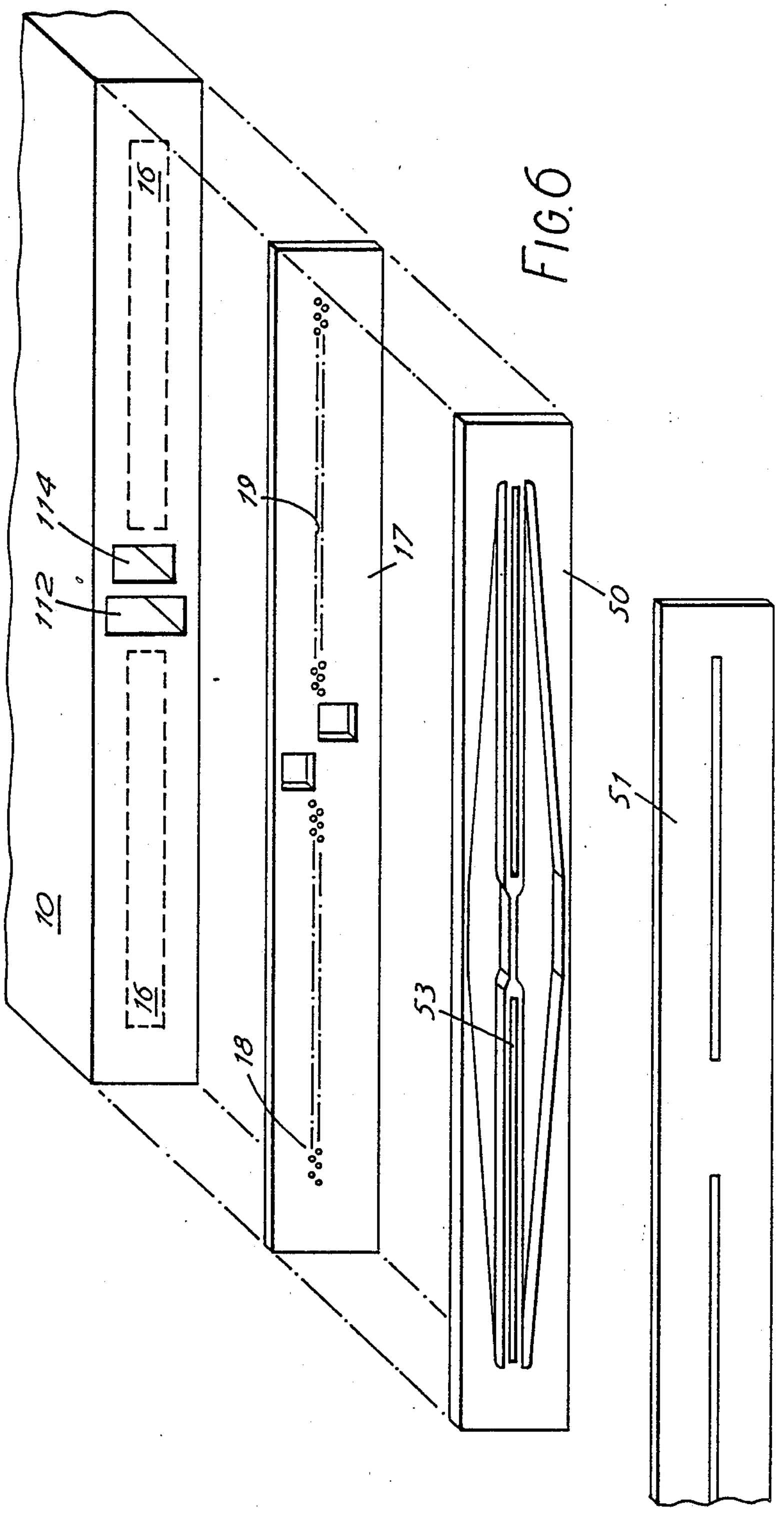
FIG. 6 is an exploded isometric view of a module, nozzle plate and housekeeping manifold.
Figure 7:
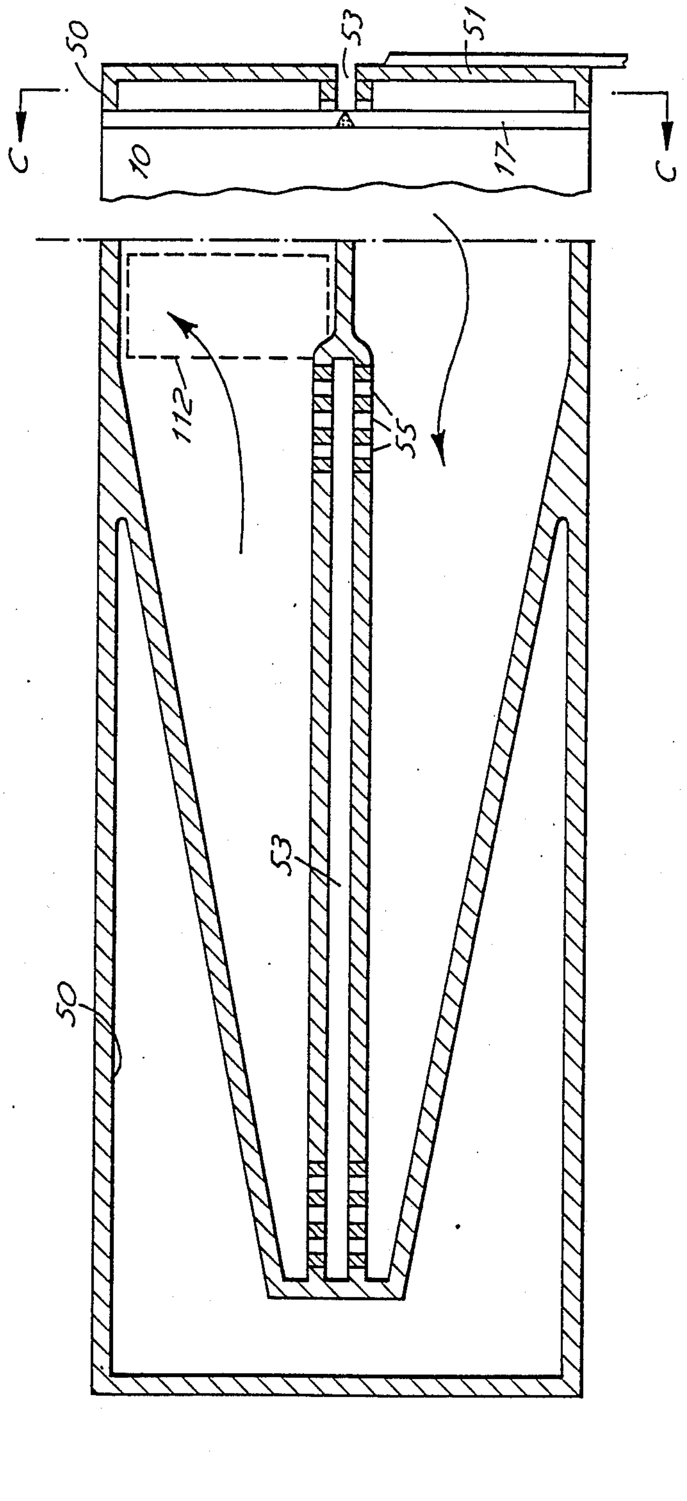
FIG. 7 shows an enlarged sectional view (with increased vertical scale) of the housekeeping manifold parallel to the nozzle plate, the portion of the figure to the left of the chain dotted line being taken on the line C—C of the portion thereof to the right of the chain dotted line.
Figure 8B:
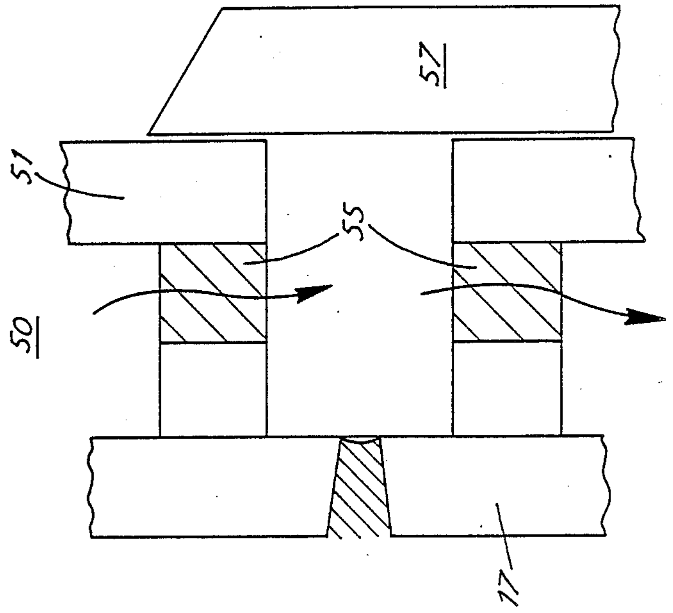
FIGS. 8(*a*) and 8(*b*) are enlarged sectional views of the housekeeping manifold normal to the nozzle plate in the plane of the air flow shields.
Figure 8A:
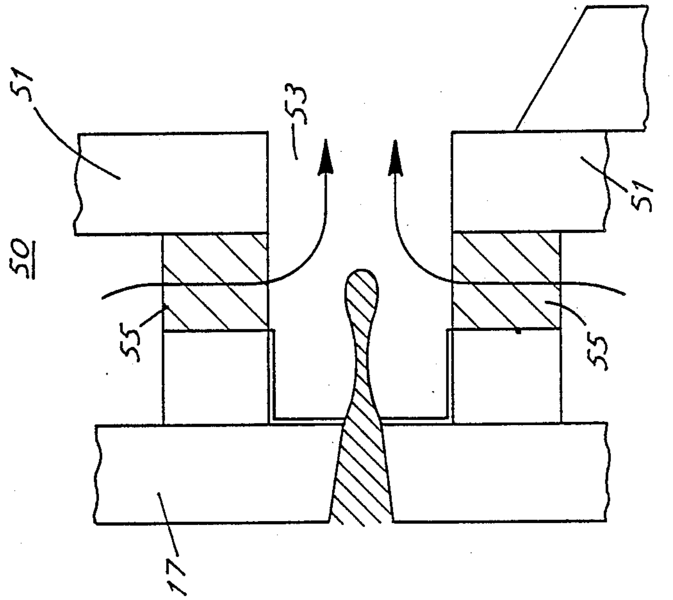

The supply of ducted air to housekeeping manifolds, which are illustrated in FIGS. 6, 7 and 8, is employed to enhance the operating reliability of the drop-on-demand printhead 1 compared with prior art printheads in which the nozzle plate faces the print paper, without the benefit of environmental control.

The general construction of the housekeeping manifolds applied to modules 10 is shown in exploded view in FIG. 6. Module 10 is of the type of construction shown in FIGS. 4 and 5 with two groups of closely spaced ink channels 16 placed on each side of the module in the majority of its width. Ducts for supplying air flows to or from the housekeeping manifold are shown at 112 and 114. A nozzle plate 17 includes two continuous rows 19 of nozzles 18 through which drops of ink are selectively ejected. Nozzle plate 17 includes apertures opposite the ducts 112 and 114. A housekeeping manifold 50 is provided for attachment to the external face of nozzle plate 17. Housekeeping manifold 50 is shown sectioned parallel to the nozzle plate to reveal the internal structure, there being simply added a cover 51 to the material illustrated. The housekeeping manifold 50 includes a trench 53 cut opposite each row of nozzles 18 so that ejected drops (see FIG. 8(*a*)) may be shot through the trench 53.

The module assembly is made by bonding module 10, nozzle plate 17, housekeeping manifold 50 and cover 51 together as illustrated in FIGS. 7 and 8. Nozzle plate 17 is first bonded to module 10 and housekeeping manifold 50 is next bonded to the nozzle plate Air ducted from bore 114 of the duct feed-throughs consequently enters the lower section of the housekeeping manifold, where it spreads with uniform velocity by reason of the tapered section and exhausts through the row of apertures 55 in the trench wall into trench 53. Suction from the printbar through bore 112 similarly exhausts air from the other side of the trench 53. Alternatively, the air flow from bore 112 can be reversed and ducted out through the row of apertures 55 which join the trench 53 to the manifold to combine with and augment the flow already exhausting into the trench from the lower manifold.

The application of the air flows provided by the housekeeping depend on the phase of operation of the printhead 1, and also on the detailed specifications of the routines required to maintain reliable operation of the printhead. This enables two longstanding reliability problems of drop-on-demand operation to be substantially eliminated.

These are:

(1) Ingress of atmospheric dust.

(2) Evaporation of solvent from the ink menisci at the nozzle plate.

The collection of dust on the nozzle plate is tolerated on travelling head drop-on-demand printers. The dust can be removed by high speed drop ejection or wiping. Such a routine is not acceptable on a wide bed drop-on-demand printer, where long term trouble free operation must be assured over the range of duty cycles experienced in the field.

Dust is inherently part of the environment of a printer; it is carried in by electrostatic fields, convection currents and with paper movement and often originates from the paper. Operation of some jets causes dust to be pumped by convection into neighboring jets. It is therefore evident that the provision of filtered dust free air past the printhead nozzles is essential for reliable operation.

Filtered air flow to protect the nozzles from dust is conveniently provided by the housekeeping manifold 50. This is conveniently made practical by supplying the ducted air flow into the small region 53 in front of the nozzles as illustrated in FIG. 8(*a*). It will be evident that the housekeeping manifold 50 need not be confined to the module construction but can also be applied to a nozzle plate the full width of the printhead; or to a travelling printhead.

In operation, the housekeeping air flow is needed during periods of operation of the printhead (FIG. 8(*a*)), but need not be employed when the printhead is dormant or waiting to be used, which is the status of a printer during the majority of its use. The trench 53 may therefore be covered by a sliding cover 57 (FIG. 8(*b*)) during dormant periods.

During operation periods the ducted air flow supplied to housekeeping manifold 50 causes scavenging air to flow in the trench and to remove solvent vapor evaporated from the ink meniscus. There are a number of strategies for preventing solvent evaporation or limiting the deleterious effects of solvent evaporation from the ink meniscus, provided by the housekeeping manifold. First, and particularly with water based ink, the ducted air can be modified to contain a proportion of solvent vapor (i.e. by controlled humidity). In many cases the partial pressure of the ink at operating temperature is low so that the solvent humidity necessary to avoid encrustation or formation of a film over the ink meniscus is low, but even high vapor pressure solvents (such as ethanol) can be held in a print ready status this way. Second, the ducted air insures that the conditions obtaining and therefore the degree of evaporation that has occurred at every nozzle is known. It is usually found that an ink will tolerate a known period such as 100 to 1000 seconds before ink drying becomes serious. Most inks have low vapor pressure additives that reduce the rate of evaporation of the low boiling point constituents. It is possible in that case to eject drops periodically from all under or unutilized nozzles, so that they are replenished with new ink as evaporation occurs, before the nozzle plug becomes too viscous, and inhibits printing.

A further strategy in to make the printhead dormant for short periods (e.g. 15 seconds) at intervals, to circulate air with a higher solvent mass ratio so that any menisci which have a reduced solvent partial pressure (i.e. are dry) are restored. This is found to occur rapidly (e.g. in less than 15 seconds) and print ready status is restored. It may be preferred to close the sliding cover 57 over the trench 53 during this operation. However when there is no printing taking place, the tendency of ejected drops to set up flows which draw dust in is minimized. Thus solvent circulation can occur without closing the sliding cover with very little solvent loss. It will therefore be seen that the housekeeping manifold provides substantial opportunities to reduce and substantially eliminate the principal causes of drop-on-demand printhead unreliability and therefore to assure the levels of availability demanded of a wide array printhead.

The housekeeping manifold further enables the printhead to be kept at a print ready status during dormant periods. This is obtained by closing the trench 53 with the sliding cover 57 (or by another means) at the beginning of a dormant period and at the same time briefly circulating solvent rich air. It is sufficient to repeat this intermittently (i.e. every ½ hour to 1 hour, depending on the temperature and other conditions) to maintain the menisci in a print ready status.

When the dormant period is very long, or the printer is disconnected from the power supply, however, the housekeeping manifold can be used to supply liquid solvent in the region of the printhead. In that case the ducted air flows may be used in a different sequence at start up to remove the solvent from the housekeeping supply ducts and to reestablish a print ready status.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A drop-on-demand ink drop printhead for selectively printing drops of ink in a print line comprising: a plurality of print modules arranged to form a given number of module layers, said layers being laterally offset from each other by an equal amount, each of said modules comprising at least one group of uniformly laterally spaced ink ejectors, the ejector groups in each of said layers being laterally space from each other by the same amount and arranged with respect to the ejector groups of the other layers such that each segment of the print line is formed by interleaving drops from vertically overlapping portions of at least two of said ejector groups with a density equal to the product of the drop deposition density of each of said groups and the number of said groups having vertically overlapping portions contributing to the formation of each respective print line segment.

2. A drop-on-demand printhead according to claim 1 wherein each of said ejector groups has the same lateral length and wherein the lateral spacing between successive ejector groups in each of said layers is equal to the product of said length and the inverse of the number of ejector groups contributing to the formation of each respective print line segment.

3. A drop-on-demand printhead according to claim 2 wherein said modules are arranged to form said layers such that the number of ejector group portions contributing to the formation of each respective print line segment is one less than said given number of layers.

4. A drop-on-demand printhead according to claim 3 wherein said modules are provided in the form of laterally offset module stacks of one module per layer said stacks being disposed in side-by-side relationship to form said layers.

5. A drop-on-demand printhead according to claim 4 wherein the ejectors of each of said modules are disposed in parallel relation and wherein each of said modules, normal to said parallel direction, is of rectangular section elongated in the lateral direction.

6. A drop-on-demand printhead according to claim 5 including means for actuating said ejectors such that actuation of ejectors from different ones of said layers is appropriately delayed to effect printing of drops therefrom on said print line.

7. A drop-on-demand printhead according to claim 6 wherein each of said ejectors comprises a pair of parallel side walls, at least one of which is piezo-electrically actuable in shear mode to effect drop ejection.

8. A drop-on-demand ink drop printhead for selectively printing drops of ink in a print line on a web or sheet movable relative to the printhead comprising, a plurality of vertically spaced layers of like print modules of which adjacent layers are laterally offset by equal amounts, each of each of said modules being formed with a row of ink drop ejectors providing at least one group of linear uniformly spaced, parallel directed ejectors, the groups of ejectors in each of the layers being laterally spaced from one another by the same amount and arranged with respect to the ejector groups of the other layers such that each segment of the print line is formed by interleaving drops from vertically overlapping portions of at least too of said ejector groups with a density which is the same for all segments of the print line and which is equal to the product of he drop deposition density capability of each group and the number of groups having portions contributing to the formation of each respective print line segment.

9. A drop-on-demand printhead as claimed in claim 8, characterized in that the lateral spacing between groups of ejectors in each layer is equal to the product of the length of the line of ejectors of each ejector group in the layer and the inverse of the number of ejector groups contributing to the formation of each respective print line segment.

10. A drop-on-demand printhead as claimed in claim 8, characterized in that the number of ejector group portions contributing to the formation of each segment of said print line is one less than the number of said layers.

11. A drop-on-demand printhead as claimed in claim 8, characterized in that the ink drop ejectors of the groups are disposed so that each segment of the print line is formed by interleaving drops from vertically overlapping portions of at least two of said ejector groups.

12. A drop-on-demand printhead as claimed in claim 8, characterized in that the print modules are formed in stacks of one module per layer and the stacks are disposed in side-by-side relationship to form the printhead.

13. A drop-on-demand printhead as claimed in claim 12, characterized in that locating means are provided on the modules for assembling the modules into stacks.

14. A drop-on-demand printhead as claimed in claim 8, characterized in that each module normal to the parallel ink ejectors thereof is of rectangular section elongated in the direction of the row of ejectors.

15. A drop-on-demand printhead as claimed in claim 8, characterized in that the modules are provided with electronic means for actuating the ink ejectors thereof, said means being adapted differentially to delay ejection of ink drops from the ejector groups of the layers to effect printing of ejected drops on the print line.

16. A drop-on-demand printhead as claimed in claim 8, characterized in that the ink ejectors of the modules are piezoelectrically actuated in shear mode.

17. A drop-on-demand printhead as claimed in claim 16, characterized in that the piezo-electrically actuated ejectors each includes parallel side walls between ink channels thereof one at least of which is actuable to effect drop ejection.

18. A drop-on-demand printhead as claimed in claim 8, including make-up ink supply means for said modules comprising a riser extending vertically through corresponding modules of the module layers and which communicates in each module with the ink ejectors.

19. A drop-on-demand printhead as claimed in claim 18, wherein said modules include manifold means connected between said riser and said ink ejectors.

20. A drop-on-demand printhead as claimed in claim 8, characterized in that each of said modules is formed with two laterally spaced groups of ink ejectors and including duct means disposed between said laterally spaced groups for supplying make-up ink thereto.

21. A drop-on-demand printhead as claimed in claim 20, characterized in that the ink supply duct means extend through each module transversely to the module layer and terminate in openings which communicate with openings of modules in adjacent module layers, there being provided between said communicating openings, liquid tight sealing means.

22. A drop-on-demand printhead as claimed in claim 20, including air supply duct means comprising a passage extending through corresponding modules of the module layers transversely to said layers and which communicates in each module with a duct which opens at the drop ejection end of the module adjacent the ejector apertures of the ink drop ejectors.

23. A drop-on-demand printhead as claimed in claim 8, characterized in that each module is formed with two spaced groups of ink ejectors and including air supply duct means therebetween, said air supply duct means comprising a passage section extending through the module transversely to the module layer and a duct which connects with said passage section and opens at the drop ejection end of the module between said groups, the arrangement being such that the passage sections of corresponding modules in the module layers form a continuous air supply passage through the module layers.

* * * * *